United States Patent
Hatz et al.

(10) Patent No.: US 6,737,775 B2
(45) Date of Patent: May 18, 2004

(54) POWER GENERATING INSTALLATION THAT COMPISES A DRIVE ENGINE AND A GENERATOR

(75) Inventors: Ernst Hatz, Ruhstorf/Rott (DE); Franz Moser, Schardenberg (AT)

(73) Assignee: Motorenfabrik Hatz GmbH & Co. KG, Ruhstorf/Rott (DE)

( * ) Notice: Subject to any disclaimer, the term of this patent is extended or adjusted under 35 U.S.C. 154(b) by 61 days.

(21) Appl. No.: 09/937,491

(22) PCT Filed: Mar. 2, 2001

(86) PCT No.: PCT/EP01/02369

§ 371 (c)(1),
(2), (4) Date: Dec. 28, 2001

(87) PCT Pub. No.: WO01/65670

PCT Pub. Date: Sep. 7, 2001

(65) Prior Publication Data

US 2002/0153791 A1 Oct. 24, 2002

(30) Foreign Application Priority Data

Mar. 2, 2000 (DE) .......................................... 100 10 248

(51) Int. Cl.[7] .................................................. H02K 7/02
(52) U.S. Cl. ............................ 310/74; 310/153; 322/4
(58) Field of Search ................................ 310/216–218, 310/152, 153, 156.63, 156.65, 74; 322/4; 290/1 A, 1 B

(56) References Cited

U.S. PATENT DOCUMENTS

| 2,874,309 A | * | 2/1959 | Stark | 290/38 A |
| 2,892,109 A | * | 6/1959 | Gayler | 310/153 |
| 2,963,599 A | * | 12/1960 | Gayler | 310/153 |
| 3,828,212 A | * | 8/1974 | Harkness et al. | 310/153 |
| 4,146,806 A | * | 3/1979 | Katsumata | 310/153 |
| 4,203,710 A | * | 5/1980 | Farr | 417/53 |
| 5,041,749 A | | 8/1991 | Gaser et al. | 310/156.22 |
| 5,705,917 A | * | 1/1998 | Scott et al. | 322/46 |
| 5,796,190 A | * | 8/1998 | Takeda et al. | 310/58 |
| 5,796,195 A | * | 8/1998 | Miyakawa | 310/68 B |

FOREIGN PATENT DOCUMENTS

| GB | 2 328 476 | 2/1999 |
| JP | 07 001975 | 1/1995 |
| WO | WO 91/00639 | 1/1991 |

OTHER PUBLICATIONS

Beer et al., "Vector Mechanics for Engineers, Statics and Dynamics", Fourth Edition, McGraw–Hill Book Company, pp. 499–500.*

* cited by examiner

Primary Examiner—Dang Le
(74) Attorney, Agent, or Firm—Katten Muchin Zavis Rosenman

(57) ABSTRACT

In a power generator unit composed of a drive motor and a generator, particularly a diesel engine and a synchronous generator with a stationary rotor winding (28) and permanent magnets (35) arranged in the rotor (29), for excitation of the generator, its rotor (29) forms the flywheel of the diesel engine, as an external rotor, and its stator (11), arranged within the rotor, carries the rotor winding (28).

6 Claims, 5 Drawing Sheets

POWER GENERATING INSTALLATION THAT COMPISES A DRIVE ENGINE AND A GENERATOR

Figure 1:
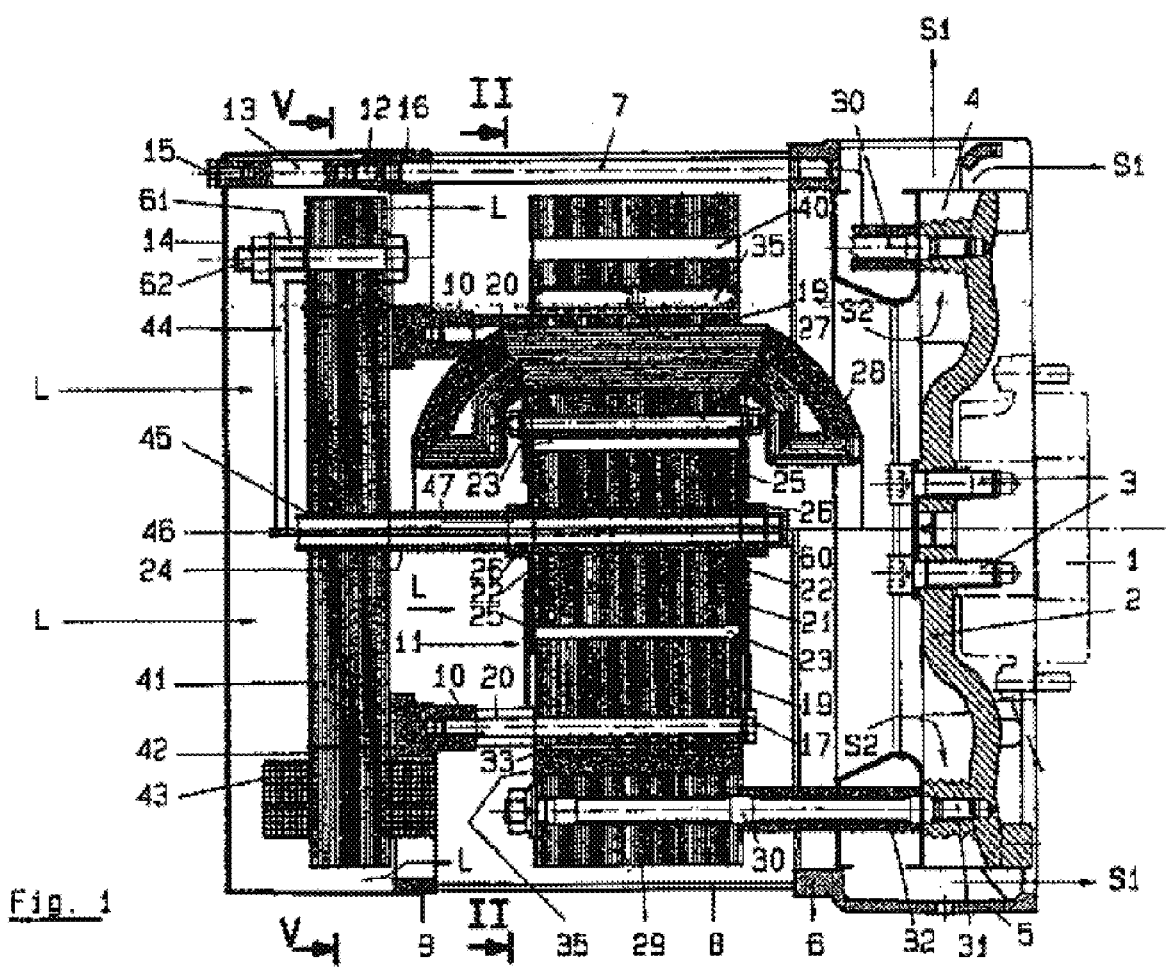

The invention relates to a power generator unit composed of a drive motor and a generator, particularly composed of a synchronous generator and a diesel engine, pursuant to the preamble of claim 1.

In the German Offenlegungsschrift 3009279, a generator that can be driven by a vehicle drive system is described, where the generator is structured as a heteropolar generator, the rotor of which is attached to the flywheel of the drive system, and where permanent magnets are provided to excite the generator, at its stator. In this connection, the voltage is generated in a winding of the stator, which is attached at the housing of the drive system, around the rotor in this drive system, formed with the motor vehicle engine, the rotor complements the flywheel of the engine. Its cooling system serves indirectly also to cool the generator.

It is a disadvantage of the known motor/generator unit that it takes up a large diameter, since its rotor is built up on the outside circumference of the flywheel; in spite of the fact that a motor and a generator are built together, no simplification of the construction, in the sense of a reduction in the number of components, is achieved. Rather, this involves the installation of a generator into the specially adapted gear housing of an engine, which must be sized with corresponding dimensions in the radial direction. Because of the limited volume available inside the gear housing, particularly in the axial direction, the electrical output of the generator is limited to the requirements of an on-board network in a motor vehicle.

A power generator unit as stated initially, which is furthermore combined with a pump unit, is described in the German patent DE 19721527. The rotor of the generator, which is attached at the crankshaft, forms the flywheel of the motor, at the same time. A coolant flow generated by the pump unit brings about cooling of the generator. Motor cooling is not described.

In contrast, the present invention is based on the task of achieving the result, in a power generator unit of the type stated initially, in terms of its design, that because of the combination, fewer components are needed, i.e. components can be used in multiple ways, and that the construction volume of the generator is low, both radially and axially. In addition, a simple method of construction is supposed to be implemented, with which the problems caused by bending of the crankshaft are eliminated and where cooling is performed in simple manner.

The aforementioned task is accomplished, according to the invention, with the characteristic of claim 1. In this connection, a) the flywheel of the diesel engine is replaced by the rotor of the generator, which in turn is built onto a fan wheel that in turn is flanged onto the crankshaft of the drive motor, at its face;

b) the stator is structured as a package of iron sheet metal, which bears the rotor windings;

c) the rotor is structured as a package of iron sheet metal, which bears the permanent magnets to generate a rotating magnetic field.

In this connection, the fan wheel provides for cooling of both the generator and the engine, in efficient and space-saving manner.

The sheet-metal construction of the rotor and the stator allow a method of construction of the generator that particularly saves volume.

It is advantageous if the rotor of the generator, which is designed as an external rotor, is structured in such a way that it possesses the full momentum of inertia of the flywheel that would otherwise be required on the motor side. This means that on the one hand, the rotor can be sized with the mass momentum of inertia of a flywheel which would otherwise be present, and on the other hand, that the momentum of inertia that is required for the motor, and is usually provided by a flywheel, for example to guarantee that the motor can be started by hand, is available to the motor.

It is furthermore advantageous in such a combination of rotor and flywheel that it easily adheres to the flicker fusion threshold.

If one assumes that a goal of the present invention is for the radial dimension of the motor-side housing flange not to be exceeded by attaching a generator housing, which limits the circumference of the rotor, its axial dimension is determined either according to the mass momentum of inertia required for the flywheel, or according to the design of the generator as required for power production. Its active magnetic mass requires a certain size for magnetic field generation in the generator.

A further decrease in size of the construction volume of the motor/generator unit results from the fact that the rotor is installed directly at the fan wheel of the motor, advantageously within its ring part that carries the blades. Because of the resulting structure of the rotor as an external rotor with a relatively large diameter, a particularly high degree of utilization of the obstructed volume is obtained, at an extremely short axial construction length.

An advantageous attachment of the stator consists of having it screwed on multiple times at the circumference of an inside ring of the generator housing lid, by means of stator screws that are passed through bores in its sheet-metal package and secure the sheet-metal package together. It is particularly practical, in this connection, that the stator screws are inserted through spacer sleeves between the stator sheet-metal package and the inside ring, and are secured between the inside ring and the side of the stator facing away from it. In this way, the complicated process of mounting the stator centered on a shaft, for example, is eliminated.

Furthermore, it is provided that the rotor is screwed on multiple times at the circumference of the fan wheel, within the ring part that carries the blades, by means of clamping screws that are passed through bores in its sheet-metal package and secure the sheet-metal package together. It is particularly practical, in this connection, that the damping screws are inserted through support sleeves between the rotor sheet-metal package and the fan wheel, and are secured between the fan wheel and the side of the rotor facing away from it.

Both with regard to the rotor and with regard to the stator, this makes it possible to implement a particularly simple method of attachment, i.e. mounting, and significant cost advantages are related with this.

In a cost-saving embodiment, it is provided that several attachment screws that pass through the entire housing length, arranged distributed over the circumference, closely within the cylinder mantle of the generator housing, are provided, which are screwed onto a motor-side connection housing, on the one hand, and onto the generator housing lid, on the other hand.

Additional cost savings result from a particularly simple structure of the generator housing as a thin-wall cylinder mantle, preferably made of sheet metal, where the generator housing is secured in place between the connection housing and the generator lid, with both faces, over a flat area.

It is practical if a protective hood of the generator housing lid on the outflow side is also made of sheet metal, and attached to the generator housing lid by means of screw bolts that extend the attachment screws for the generator housing.

Inside the protective hood, a rotary magnet can be provided as a voltage regulator. It is advantageous in this connection if its yoke, which carries an exciter winding, is attached to the generator housing lid. In case of an electronic voltage regulation, which does not require any noteworthy space, a protective hood with a particularly flat structure can be used, with a corresponding reduction in the length of the generator part.

With the present invention, it has become possible to create a motor/generator unit with which cost savings as compared with conventional comparable units of up to 50% are made possible, on the side of the electrical technology part, for a rated output of approximately 10 kVA, for example. It is particularly suitable as a network frequency power generator with low output and a small construction size.

Figure 2:
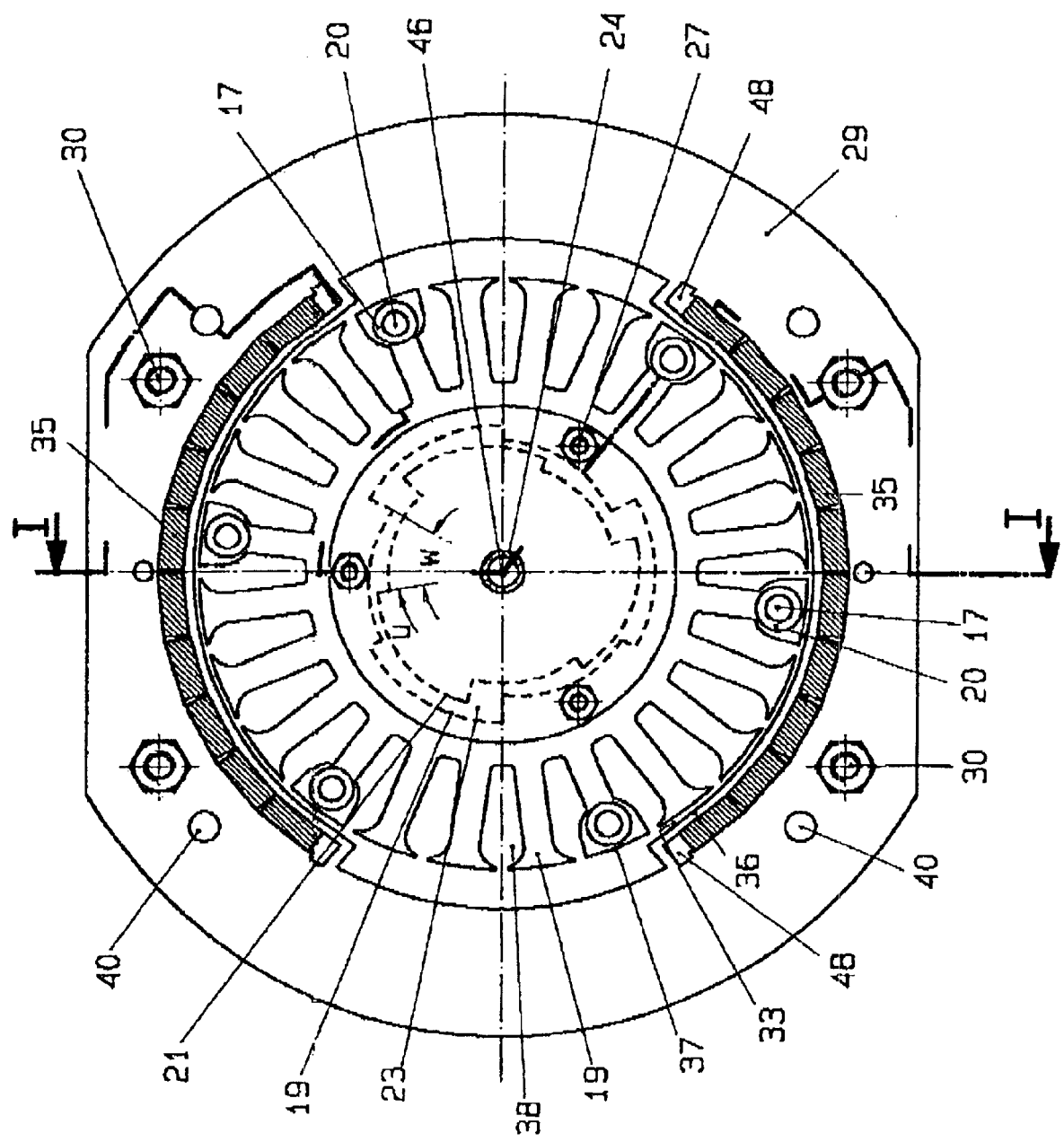
Figure 3:
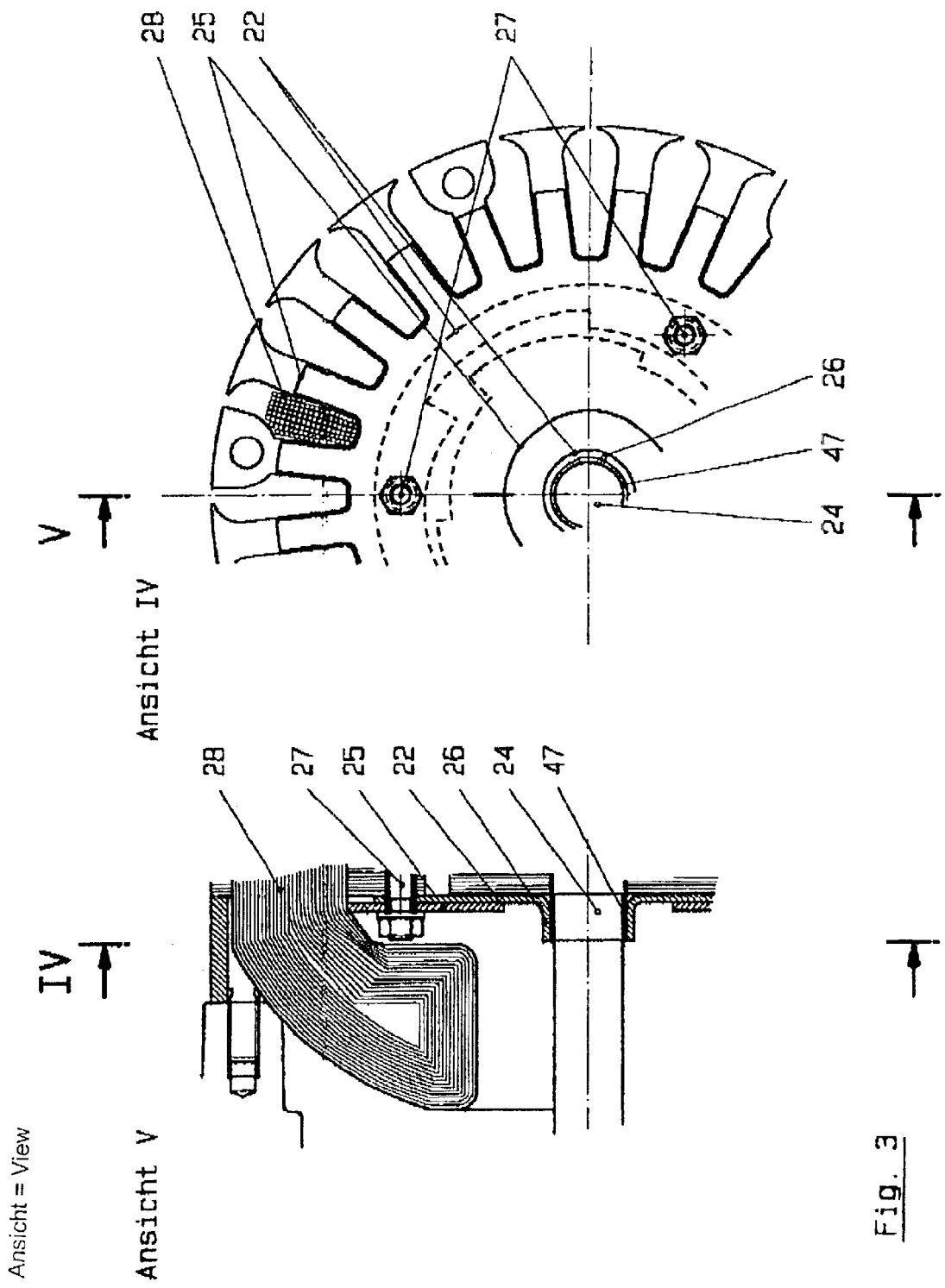
Figure 4:
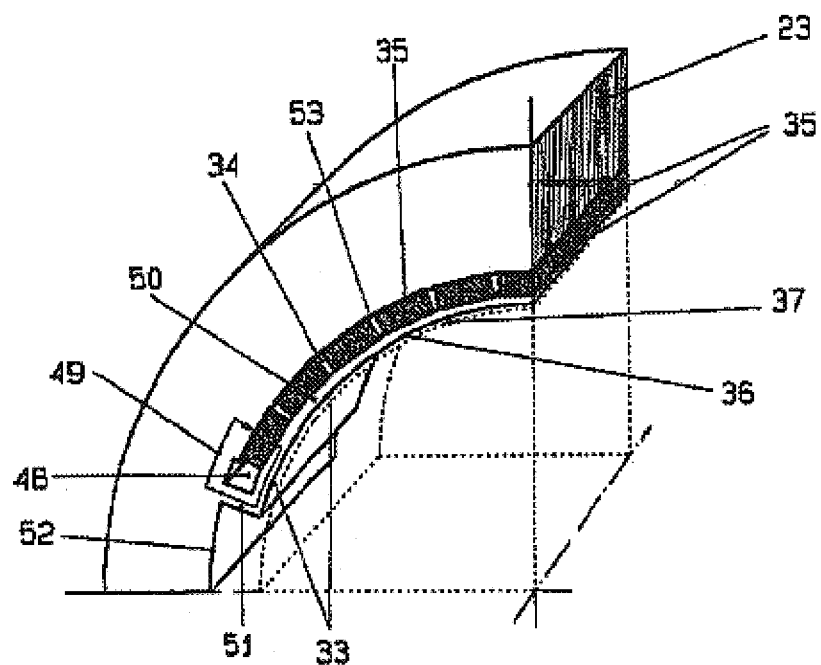
Figure 5:
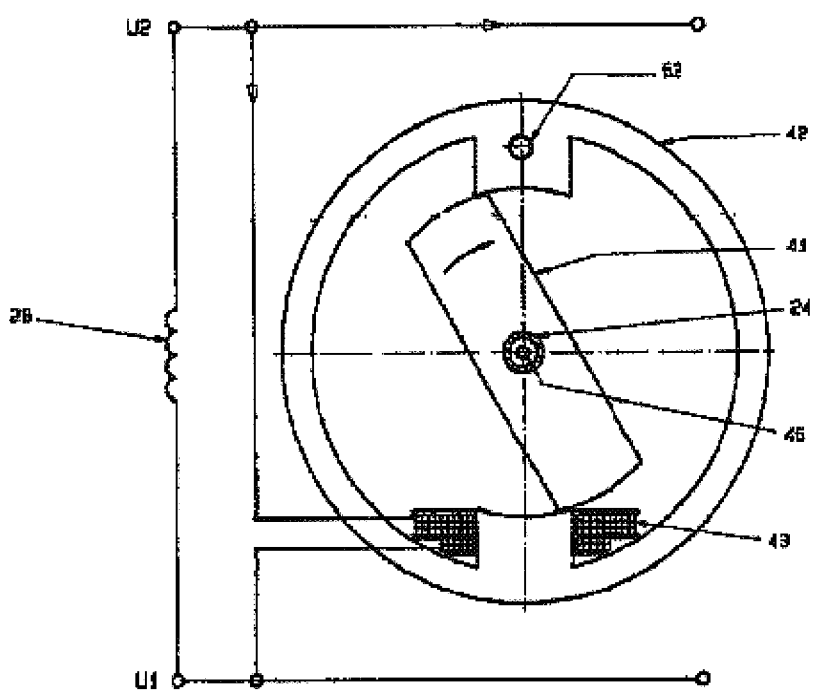

In the following, an exemplary embodiment of the invention will be explained on the basis of the drawing. This shows:

FIG. 1 an axial cross-section through a motor/generator unit according to Section I—I of FIG. 2, FIG. 2 a view of the stator and the rotor of the motor generator unit according to Section II—II of FIG. 1, FIG. 3 a partially axial view of the stator, on a larger scale, corresponding to FIG. 2, FIG. 4 a three-dimensional portion of the rotor with permanent magnets, and FIG. 5 a view of the voltage regulator according to Section V—V of FIG. 1.

The electrical machine forming a power generator as shown in FIGS. 1 to 3 relates to a unit composed of a drive motor and a synchronous generator. Preferably, a diesel engine is used as the drive motor, but only the connection-side end of its crankshaft 1 is shown with a broken line. On the face of the crankshaft 1, a fan wheel 2 is attached by means of screws 3. The fan wheel 2 possesses blades 4 to produce an air flow in accordance with arrow S1, for cooling the motor, where the inflowing air according to arrow S2 corresponds to the cooling air flowing out of the generator housing after generator cooling. As shown in FIG. 1, the generator housing lid 9 that is provided on the (current) outflow side possesses intake openings for the cooling air that flows in according to arrows L. In order for this cooling air flow to achieve its full cooling effect in the generator housing 8, the protective hood 14 possesses one or more inlet openings for the cooling air, with an appropriate size (not shown).

A connection housing 5 on the motor side encloses the space in which the fan wheel 2 is housed, radially to the outside; it is open on both sides and, on its side opposite the motor, possesses a ring flange 6 with threaded bores for screwing in attachment screws 7 for connecting the cylindrical generator housing 8, where it is practical if the latter is made of sheet metal, in which flange the housing is clamped in place on both faces, over a flat area. The attachment screws 7 are arranged resting against the inside of the generator housing 8, distributed over its circumference, and pass through the entire housing length. On the outflow side, the left end of the generator housing 8 in the drawing, a generator housing lid 9 is provided, which has an inside lid ring 10 with spokes that project radially inward, to which the stator 11 of the generator is attached. With their outflow-side ends, the shafts of the attachment screws 7 project through bores in the generator housing lid 9; at their free threaded ends 12, screw bolts 13 are screwed on, which serve to attach the generator housing 8 to the generator housing lid 9 as well as to attach the protective hood 14 by means of short screws 15; these are screwed in from the outside, through corresponding bores in the protective hood 14, into threaded bores of the facing ends of the screw bolts 13. The protective hood 14 covers the related free end of the generator housing lid 9 from the outside, with its edge segment 16 that forms the open end.

While eight attachment screws 7 are provided according to the present embodiment, distributed over the circumference, six stator screws 17 are sufficient to attach the stator to the inside lid ring 10, which screws are passed through bores of the sheet-metal package of an outside stator part 19 and are screwed into the lid ring 10 via spacer sleeves 20 between the inside lid ring 10 and the facing side of the outside stator part 19.

In this way, the outside stator part 19 is fixed firmly in place on the housing, where the sheet-metal package that forms the outside stator part 19 is secured together by the stator screws 17.

The sheet-metal package that forms an inside stator part 21 is arranged on a hollow shaft 24, so as to rotate with it. The hollow shaft 24 is connected with a torsion rod 46 that is arranged in the shaft axis with prestress, via its end cap 60. It is mounted to rotate on bearing bushings 47 in bearing flanges 26 of sheathing plates 22, which are arranged on opposite faces of the sheet-metal package. The end of the torsion rod 46 that lies opposite the end cap 60 is fixed in place on the housing via a rigid rod support 44. Its attachment eye 61 is seated on a screw 62, which secures the sheet-metal package of the iron yoke 42 together. The sheathing plates 22 cover a control air gap 23 between the inside stator part 21 and the outside stator part 19. Since the sheet-metal package that forms the inside stator part 21 is therefore seated on the hollow shaft 24 so as to rotate with it, it also performs its rotation for the purpose of the desired constant regulation of the generator voltage. Adjustment of the inside stator part 21 relative to the outside stator part 19 for the purpose of regulating the generator voltage will be described in further detail below.

The view according to FIG. 2 shows not only the contour of the sheet-metal package that forms the rotor 29, but also the contour of the sheet-metal packages that form the stator, which packages have cut-outs 38 to hold the winding wires of the rotary current winding 28 of the generator, in the region of the outside stator part 19; it does not show the insulation plate 25 shown in FIG. 1, which was left out in order to improve the view. The outside stator part 19 is attached to the inside lid ring 10 shown in FIG. 1, by means of stator screws 17 passed through bores 39 in its sheet-metal package. In accordance with the selected section line, one can also see the spacer sleeves 20, which support the sheet-metal package of the outside stator part 19 against the inside lid ring 10.

Three holding screws 27 serve to center the inside stator part 21 within the outside stator part 19, by means of lateral sheathing plates 22, in the bearing flanges 26 of which the hollow shaft 24 is mounted with the sheet-metal package of the inside stator part 21.

The sheathing plates 22 are also covered by an insulation plate 25, in each instance, towards the outside, in the region of the control air gap 23, which serves to provide electrical insulation of the rotary current winding 28 of the generator, as well as of three holding screws 27 arranged distributed over the circumference, from the sheathing plate 22. The holding screws 27 run through bores in the sheet-metal package that forms the outside stator part 19. They are insulated from the sheet-metal package by means of insulation sleeves, and center the inside stator part 21 relative to the outside stator part 19 via the sheathing plates 22.

The stator 11 is surrounded by the rotor 29, which is also composed of a sheet-metal package, which is secured by means of clamping screws 30, which are screwed into corresponding threaded bores of the fan wheel 2 with a motor-side threaded end 31. Support sleeves 32 pushed onto the clamping screws 30 are secured between the fan wheel and the related side of the rotor 29. In this way, the rotor 29 is connected with the fan wheel 2 so as to rotate with it. On its inside circumference, it forms a narrow air gap 33, with a width of approximately 2 mm, relative to the stator 11. In addition, the rotor 29 has approximately cylindrical pockets 34 that go through in the axial direction, and run within two pole segments, into which magnet elements 35 in the form of narrow ingot-shaped rods are inserted from both sides, specifically, in the present example, as is evident from FIG. 2, two rows of ten magnet elements 35, in each instance, arranged next to one another, which are responsible for the magnetic excitation of the generator. In the region of the pockets 34, the inner contour line 36 of the circumference wall 50 of the rotor 29, which delimits the pockets 34 radially towards the inside, forms the narrow air gap 33, together with the outer contour line 37 of the stator 11. Bores 40 in the rotor plates serve for installation of a starter (not shown).

In accordance with FIGS. 2 and 4, the magnet elements 35 are pushed into the pockets 34 axially, so that they form the two poles lying next to one another, distributed in polygon shape. The subdivision of the permanent magnets for the poles into small magnet elements 35 allows them to be produced in economically efficient manner; their installation is greatly facilitated by means of a suitable magnetic ground 49, because in this way the mutual repulsion of adjacent magnet elements 35 is practically eliminated. The individual magnet elements 35 can be pushed into the pockets 34 practically without any force. In this connection, no special attachment of the magnet elements 35 is required, since they are held in the axial direction by their magnetic forces during operation, and are supported in the pockets, viewed in the radial direction, so that they can easily withstand the centrifugal forces that occur during operation.

In the three-dimensional representation of the magnet arrangement according to FIG. 4, a cavity 48 is provided at the end of the cut-out in which the magnet elements 35 are seated. Without this cavity 48, the extraordinarily great flow density in this region would result in magnetic reversal in the case of a surge short-circuit of the generator, and therefore in destruction of the outside magnet element 35. By structuring the cavity 48 with a defined magnetic ground 49, this magnetic reversal can be prevented. The cavity 48 is formed by an extension of the inside circumference wall 50 of the pockets 34 and a bridge 51 adjacent to the pole gap 52, through which the magnetic ground 49 runs. Ribs 53 that run axially on the insides of the pockets 34 define the distances between the magnet elements 35.

FIG. 3 shows an enlarged portion of FIG. 2, to make the illustration more clear, where parts that agree with one another are designated with the same reference symbol. Insulation plate 25 and sheathing plate 22, which serves to position the inside stator part 21, are indicated with reference lines at the outside and inside contour in FIG. 3, in each instance. The bearing bushing 47 is shown from the face side. In a portion 38 of the outside stator part 19, winding wires of the rotary current winding 28 are shown in cross-section.

The changeable control air gap 23 between the outside stator part 19 and the inside stator part 21 is essential for the principle of functioning of the voltage regulation of the generator. The circumference surfaces of the inside stator part 21 that are adjacent to the control air gap 23, on the one hand, and those of the outside stator part 19, on the other hand, are structured with three segments over the circumference, where the three individual segments have projecting circumference segments that run approximately in screw shape, deviating from the circular shape. For example, the control air gap 23 becomes narrower, if one turns the inside stator part 21 relative to the outside stator part 19, in the clockwise direction, in accordance with the arrow U (FIG. 2), starting from the position shown with broken lines, where the end position is reached approximately at a path of rotation in accordance with the angle w. In this end position, the control air gap 23 is the smallest it can be.

By turning the inside rotor part 21 relative to the outside rotor part 19, the geometry of the control air gap 23 and therefore the magnetic resistance in the stator 11 are changed. This circumstance is utilized in the present permanently excited synchronous machine to regulate the voltage. By changing the magnetic flow as described, it is possible to regulate the induced voltage, where there is a direct proportionality between the latter and the magnetic flow. Because of the fact that the inside stator part 21 is seated on a hollow shaft 24 with a pre-stressed torsion rod 46, torsion forces that counteract the force effects of the magnetic field on the inside stator part 21 are mobilized, so that the rotation of the inside stator part 21 relative to the outside stator part 19 that is applied for the purpose of voltage regulation can take place almost without force, using a rotary magnet 41. However, this presumes that the torsion pre-stress is adapted to the magnetic resetting force.

The rotary magnet 41 shown in FIGS. 1 and 5 is arranged on the inside of an iron yoke 42, which carries a winding 43 controlled by the generator terminal voltage. In this connection, voltage variations at the generator winding result in a rotation of the rotary magnet 41, and thereby cause the desired constant regulation of the voltage by means of a relative rotation between the two stator parts. In accordance with FIG. 1, the rotary magnet 41 is over-mounted on the related end of the hollow shaft 24, which in turn is connected to rotate with the inside stator part 21. The rotary magnet 41 is seated centered on a bearing segment 45 at the end of the hollow shaft 24, and is pressed against a shoulder of the hollow shaft 24 there. Preferably, the rotary magnet 41 with the related yoke 42 are each formed from sheet metal.

In accordance with FIG. 5, the electrical circuit for activation of the rotary magnet 41 is also drawn in. The winding 43, which is affixed at one of the poles of the iron yoke 42, is applied to the terminal voltage U1, U2 of the generator winding 28. In this connection, the magnetic flow is directly proportional to the induced voltage and controls the rotation of the rotary magnet 41 and also of the inside stator part 21, via the hollow shaft 24, causing the geometry of the control air gap 23 and therefore the magnetic resistance in the stator 11 to be changed. The result is simple regulation of the terminal voltage of the generator, independent of the power factor cos ψ.

What is claimed is:

1. Power generator unit comprising:
   an engine and a generator,
   a rotor driven by said engine around a stator, said stator arranged within said rotor, said rotor provided with permanent magnets for excitation of the generator, wherein said rotor forms the flywheel of the engine, the rotor is built onto a fan wheel that in turn is flanged onto a crankshaft of a face of the engine, wherein the fan wheel is used for cooling the generator and the engine;

the stator is structured as a package of iron sheet metal and is screwed on multiple times along a circumference of an inside ring of a generator housing lid by means of stator screws that are passed through bores in the stator and secure the stator together;

the rotor is structured as a package of iron sheet metal, which bears the permanent magnets to generate a rotating magnetic geld, and as screwed on multiple times at the circumference of the fan wheel by means of clamping screws that are passed through bores in rotor and secure the rotor together.

2. Power generator unit according to claim 1, wherein the clamping screws are screwed onto the fan wheel within a ring part of said fan wheel that carries blades of said fan wheel.

3. Power generator unit according to claim 1, further comprising several attachment screws that pass through a generator housing over the circumference of the generator housing, which are screwed between a motor-side connection housing and the generator housing lid.

4. Power generator unit according to claim 3, wherein the generator housing is made of sheet metal and secured in place between the motor-side connection housing and the generator lid.

5. Power generator unit according to claim 1, wherein the stator screws are inserted through spacer sleeves between the stator and the inside ring, and are secured between the inside ring and the stator.

6. Power generator unit according to claim 1, wherein the clamping screws are inserted through support sleeves between the rotor and the fan wheel, and are secured between the fan wheel and the rotor.

\* \* \* \* \*